United States Patent
Jones

(10) Patent No.: US 10,951,329 B1
(45) Date of Patent: Mar. 16, 2021

(54) TESTING OF A BASE STATION WITH BEAMFORMING CAPABILITY

(71) Applicant: VIAVI Solutions Inc., San Jose, CA (US)

(72) Inventor: Adrian Jones, Letchworth (GB)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/670,094

(22) Filed: Oct. 31, 2019

(51) Int. Cl.
| | | |
|---|---|---|
| *H04B 7/14* | (2006.01) | |
| *H04B 17/12* | (2015.01) | |
| *H04B 7/0417* | (2017.01) | |
| *H04B 7/06* | (2006.01) | |
| *H04B 17/21* | (2015.01) | |

(52) U.S. Cl.
CPC ........... *H04B 17/12* (2015.01); *H04B 7/0417* (2013.01); *H04B 7/0617* (2013.01); *H04B 17/21* (2015.01)

(58) Field of Classification Search
CPC ...... H04B 17/12; H04B 17/21; H04B 7/0417; H04B 7/0617
USPC ........................................ 455/25, 561, 226.1
See application file for complete search history.

(56) References Cited

U.S. PATENT DOCUMENTS

| | | | | |
|---|---|---|---|---|
| 2007/0285314 | A1* | 12/2007 | Mortazawi | H01Q 1/3233 342/375 |
| 2008/0317145 | A1* | 12/2008 | Clerckx | H04B 7/043 375/260 |
| 2010/0087227 | A1* | 4/2010 | Francos | H03F 1/3247 455/562.1 |
| 2016/0254870 | A1* | 9/2016 | O'Keeffe | H01Q 21/24 455/67.14 |

\* cited by examiner

*Primary Examiner* — Sonny Trinh
(74) *Attorney, Agent, or Firm* — Harrity & Harrity, LLP

(57) ABSTRACT

A base station testing system may receive one or more input signals originating from one or more transceivers of a base station. The base station testing system may form, based on the one or more input signals, one or more output signals associated with a beam direction. The base station testing system may provide a feedback signal, that is based on the one or more output signals, to a calibration component of the base station.

20 Claims, 5 Drawing Sheets

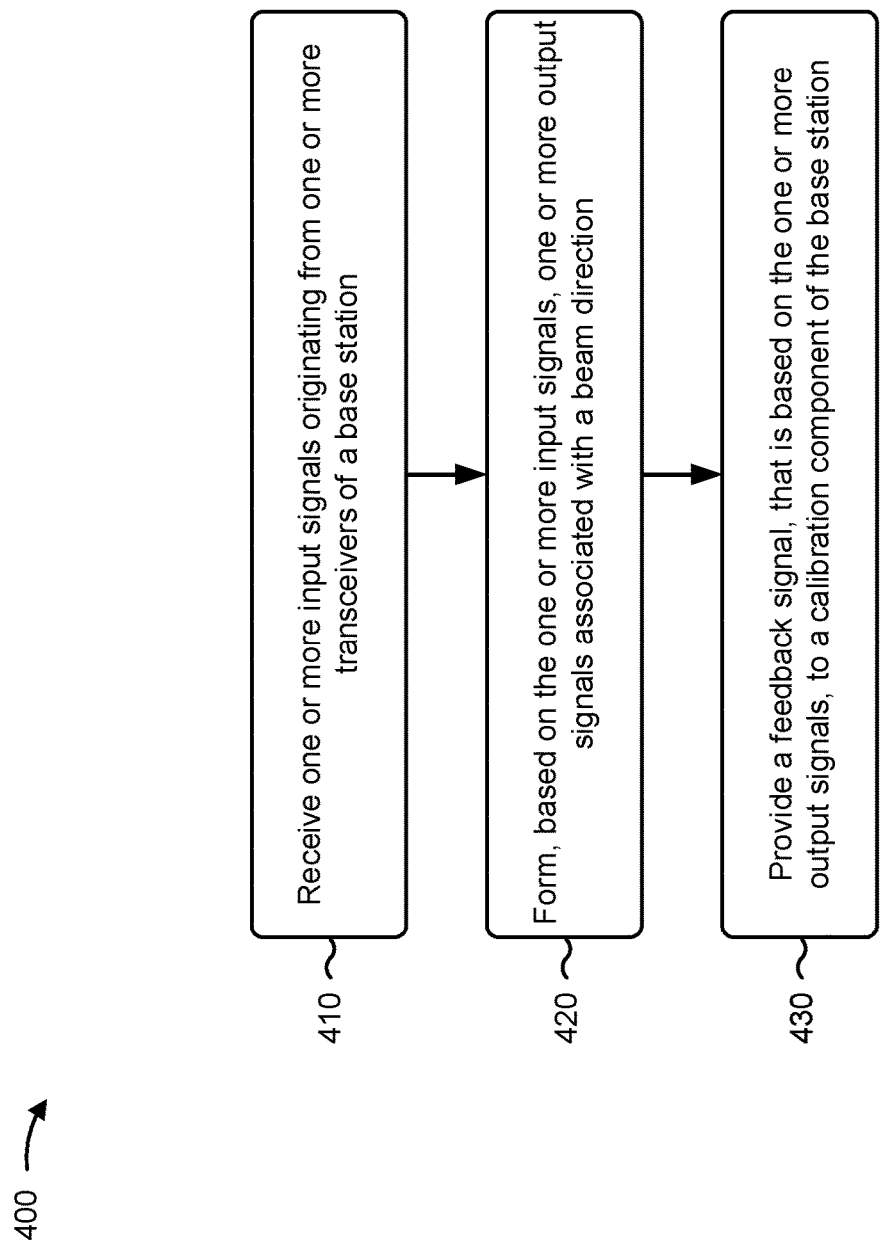

TESTING OF A BASE STATION WITH BEAMFORMING CAPABILITY

BACKGROUND

A base station may transmit a beamformed radio frequency (RF) signal. Beamforming may include a signal processing technique used for directional signal transmission and/or reception. For example, beamforming may be achieved by combining elements in an antenna array such that an RF signal experiences constructive interference at a particular angle. Beamforming can be used at both the transmitting and receiving ends of the RF signal.

SUMMARY

According to some implementations, a base station testing apparatus may include a beamforming network, including: at least one input port configured to receive one or more input signals originating from one or more transceivers of a base station, and at least one output port configured to receive a signal from the at least one input port that is based on the one or more input signals, and to output, based on the signal, one or more output signals associated with a beam direction; and a feedback component configured to provide a feedback signal, that is based on the one or more output signals, to a calibration component of the base station.

According to some implementations, a base station testing system may include a feedback component configured to output one or more feedback signals that are based on one or more calibration signals received from a calibration component of a base station; a beamforming network configured to provide one or more output signals, that are based on the one or more feedback signals and are associated with a beam direction, to the base station; and a test component configured to receive the one or more feedback signals of the feedback component.

According to some implementations, a method may include receiving, by a base station testing system, one or more input signals originating from one or more transceivers of a base station; forming, by the base station testing system and based on the one or more input signals, one or more output signals associated with a beam direction; and providing, by the base station testing system, a feedback signal, that is based on the one or more output signals, to a calibration component of the base station.

BRIEF DESCRIPTION OF THE DRAWINGS

FIG. 4 is a flowchart of an example process for testing a base station with beamforming capability.

DETAILED DESCRIPTION

The following detailed description of example implementations refers to the accompanying drawings. The same reference numbers in different drawings may identify the same or similar elements.

A base station may transmit various beamformed wireless signals (e.g., beamformed radio frequency (RF) signals). A network technician may want to perform an analysis of the various beamformed wireless signals. For example, the network technician may want to perform the analysis of the various beamformed wireless signals to determine interference associated with the various beamformed wireless signals, to perform an analysis of metrics related to the various beamformed wireless signals, and/or the like. In some cases, a testing system may be connected to the base station, and the testing system may simulate a beamformed signal of the base station in order to permit analysis of the simulated beamformed signal. For example, the testing system may use a beamforming network to produce, based on a signal provided by the base station, a signal associated with a beam direction, and the testing system may perform an analysis on the produced signal.

However, the signal produced by the beamforming network may be phase shifted from the signal provided by the base station, thereby causing inaccuracies in testing of the base station. For example, phase shifting may be caused by cables connecting the base station and the testing system (e.g., variations in lengths of the cables, impedances of the cables, and/or the like), miscalibration of the base station and/or the testing system, signal processing components (e.g., amplifiers) used at the base station and/or the testing system, and/or the like. In some cases, the base station may include a calibration component that receives feedback on signals produced by the base station, to thereby compensate for phase errors associated with the signals. However, the calibration component may not receive feedback from the testing system, and therefore cannot compensate for phase errors resulting from the testing system.

Some implementations described herein provide a testing system for testing of a base station with beamforming capability (e.g., a base station enabled for multiple-input and multiple-output (MIMO) communication). In some implementations, the testing system may provide a feedback signal to a calibration component of the base station. The feedback signal may be based on an output signal of a beamforming network of the testing system. In this way, the testing system enables the calibration component to compensate for phase errors associated with the testing system. Accordingly, the testing system provides improved accuracy of testing and analysis of the base station, and in particular, improved accuracy of testing and analysis of a beam of the base station.

Figure 1A:
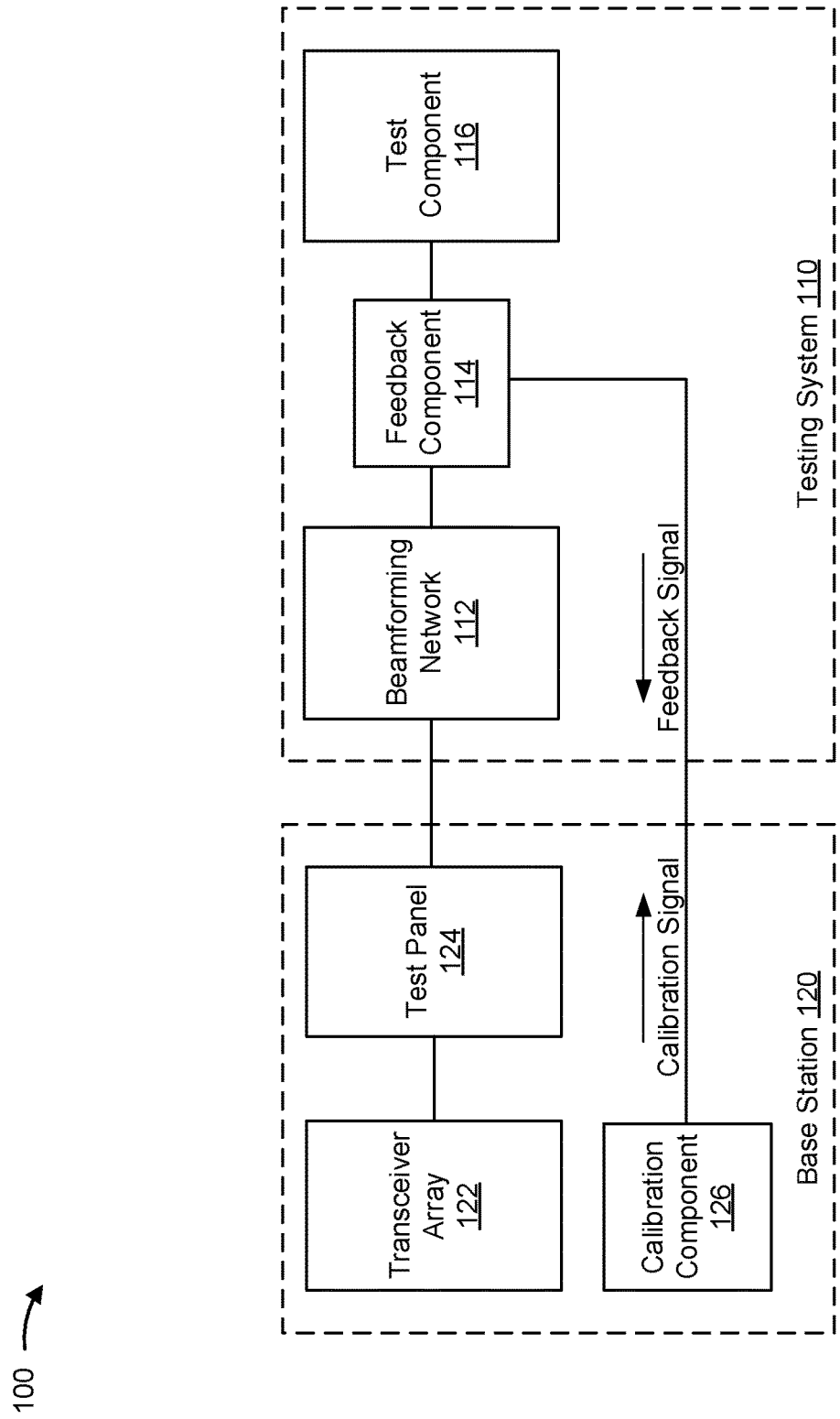
FIGS. 1A and 1B are diagrams of one or more example implementations described herein.
Figure 1B:
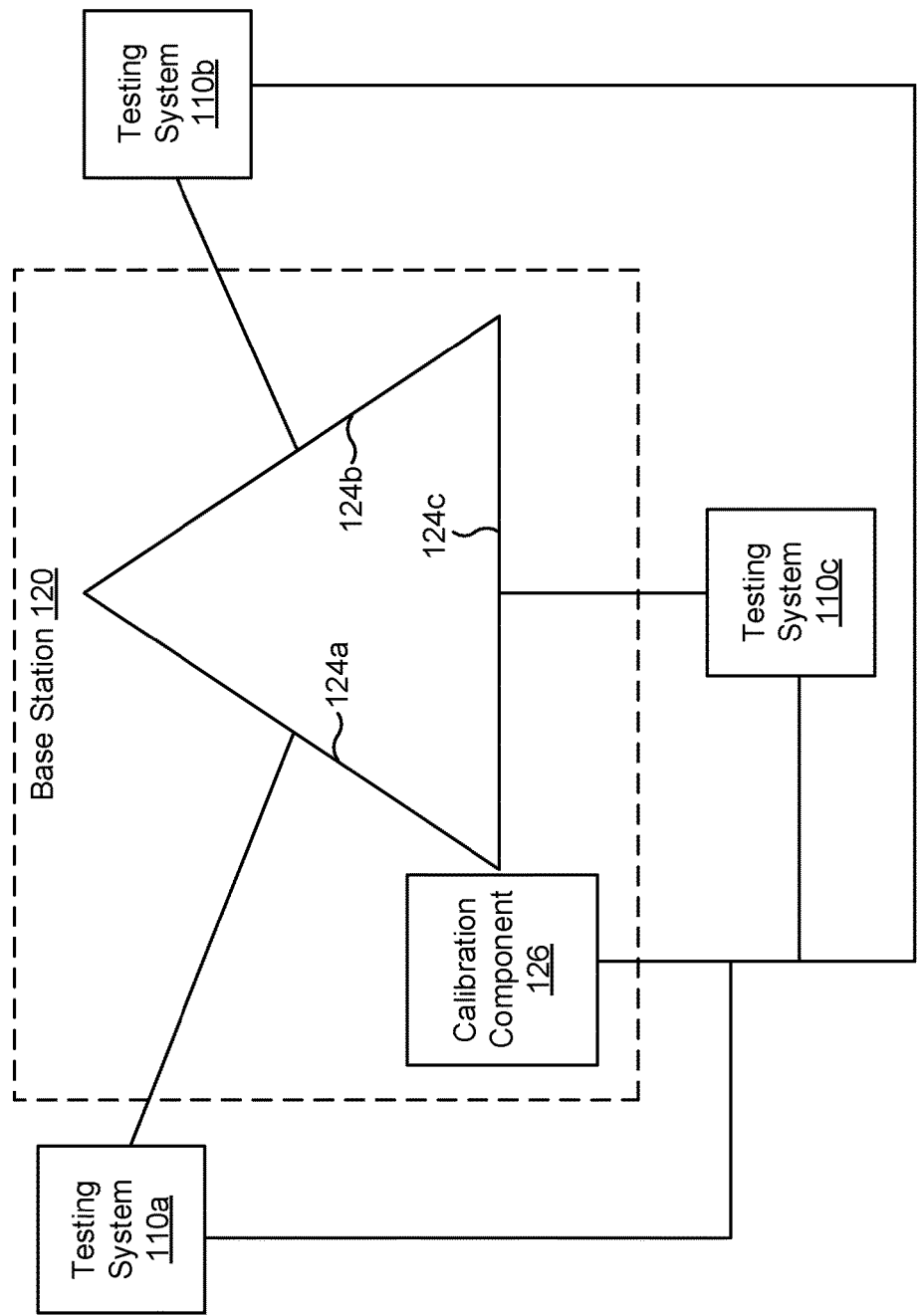

FIGS. 1A and 1B are diagrams of one or more example implementations 100 described herein. As shown in FIGS. 1A and 1B, the example implementation(s) 100 may include a testing system 110 and a base station 120. The base station 120 may be a node of a radio access network of a mobile network (e.g., a cellular network). For example, the base station 120 may facilitate communication between a user equipment (UE) and the mobile network, another data network, another UE, and/or the like. In an operating scenario, the base station 120 may include an antenna array and one or more computing devices (e.g., server devices) to facilitate communication with a UE. In some implementations, the base station 120 may be enabled for MIMO communication. That is, the base station 120 may be capable of transmitting a beamformed wireless signal using the antenna array.

The testing system 110 may enable a network technician to perform testing, analysis, troubleshooting, and/or the like, of the base station 120. For example, the testing system 110 may enable the network technician to perform analysis of one or more beamformed signals (e.g., to determine interference associated with beamformed signals), to perform an analysis of metrics related to one or more beamformed signals, to perform troubleshooting of one or more beamformed signals, and/or the like. Accordingly, the testing system 110 may generate data, metrics, and/or the like, based on one or more beamformed signals of the base station 120. In a testing scenario, the testing system 110 may be connected to the base station 120 (e.g., by a wired connection, such as by one or more cables) to enable the testing system 110 to process a signal (e.g., a beamformed signal, a calibration signal, and/or the like) of the base station 120.

As shown in FIG. 1A, the base station 120 may include a transceiver array 122, a test panel 124, and a calibration component 126. The transceiver array 122 may include one or more transceivers configured to transmit and/or receive radio signals in connection with an antenna array. In a testing scenario, the transceiver array 122 may be connected to the test panel 124 rather than an antenna array. The test panel 124 may include one or more connectors, corresponding to antenna elements of an antenna array, that permit connection of the testing system 110 to the base station 120. Accordingly, the testing system 110 may receive a signal originating from one or more transceivers of the transceiver array 122 via the test panel 124.

The calibration component 126 may be a calibration receiver (e.g., that receives a feedback signal) and/or a calibration transmitter (e.g., that transmits a calibration signal). The calibration component 126 may be a computing device (e.g., a server device) of the base station 120. The calibration component 126 may determine a particular calibration, such as a signal phase calibration, for the base station 120 (e.g., for one or more transceivers of the transceiver array 122). In an operating scenario, the calibration component 126 may be configured for connection to an antenna array of the base station 120 and to receive a feedback signal from the antenna array. However, in a testing scenario, the calibration component 126 may be connected with the testing system 110, as described below. Accordingly, in a testing scenario, the calibration component 126 may not be connected to an antenna array, to the test panel 124, and/or the like.

As shown in FIG. 1A, the testing system 110 may include a beamforming network 112, a feedback component 114, and a test component 116. The beamforming network 112 (e.g., a phase-shifting network) may be configured to simulate a beam direction, such as a beam direction that may be produced by the antenna array of the base station 120 in an operating scenario. For example, the beamforming network 112 may include a Butler matrix or a similar beamforming network. In a testing scenario, the beamforming network 112 may be connected to the test panel 124 of the base station 120 (e.g., by a wired connection, such as by one or more cables (e.g., antenna port cables)).

The beamforming network 112 may include at least one input port (e.g., antenna port) configured to receive an input signal originating from one or more transceivers of the transceiver array 122 of the base station 120 (e.g., via the test panel 124). The input signal may be a signal of the base station 120 that would cause an antenna array of the base station 120 to beamform a wireless signal in an operating scenario. In a testing scenario, the input signal may cause the beamforming network 112 to generate an output signal associated with a beam direction.

For example, the beamforming network 112 may include at least one output port (e.g., beam port) configured to receive, from the at least one input port of the beamforming network 112, a signal that is based on the input signal originating at the base station 120. In addition, the at least one output port may be configured to output an output signal that is based on the signal received from the at least one input port. In other words, the beamforming network 112 may cause excitation of a particular output port based on the input signal received at the at least one input port. In some implementations, the at least one output port may be a broadside port. The output signal (e.g., caused by excitation of the particular output port) may be associated with a particular beam direction. In some implementations, the beamforming network 112 may be bi-directional, such that an output port, as described above, may be used as an input port, and an input port, as described above, may be used as an output port.

The beamforming network 112 may be configured to provide the output signal to the test component 116. For example, the beamforming network 112 may be connected to the test component 116 (e.g., by a wired connection, such as by one or more cables (e.g., beam port cables)). The test component 116 may perform testing, analysis, troubleshooting, and/or the like, of the base station 120 based on the output signal and/or generate data, metrics, and/or the like based on the output signal. For example, the test component 116 may include a signal analyzer, a signal generator, a UE emulator, a UE, and/or the like. In some implementations, the test component 116 may include a user interface to enable a network technician to view data, metrics, results of testing, analysis, or troubleshooting, and/or the like. In some implementations, the test component 116 may include a communication interface for transmitting data, metrics, results of testing, analysis, or troubleshooting, and/or the like, to a user device of the network technician.

The beamforming network 112 also may be configured to provide the output signal to the feedback component 114. In some implementations, the feedback component 114 may be a device located between the beamforming network 112 and the test component 116. For example, an input of the feedback component 114 may be connected to an output of the beamforming network 112 and an output of the feedback component 114 may be connected to an input of the test component 116 (e.g., by a wired connection, such as by one or more cables (e.g., beam port cables)). In some implementations, the feedback component 114 may be a component included in the beamforming network 112. For example, the feedback component 114 may be connected to, or otherwise associated with, the at least one output port of the beamforming network so as to receive the output signal prior to the output signal exiting the beamforming network 112.

The feedback component 114 may be a passive device, such as a coupler (e.g., an RF coupler). For example, the feedback component 114 may receive the output signal of the beamforming network 112 as an input, and may provide two or more outputs (e.g., two or more signals) based on the input. In some implementations, a first output (e.g., that is to be provided to the test component 116) may be an unaltered output (e.g., unaltered, or substantially unaltered, from the input), and a second output (e.g., that is to be provided to the base station 120) may be a coupled output (e.g., a sample of the input that is altered from the input, such as an alteration of a power level from the input). In some implementations, the feedback component 114 may be configured according to a coupling coefficient that dictates a particular power level of the coupled output that satisfies a threshold power level (e.g., a threshold power level used by the calibration component 126).

The feedback component 114 may be configured to provide a feedback signal to the base station 120. For example, the feedback component 114 may be configured to provide the feedback signal to the calibration component 126 of the base station 120. The feedback signal may be based on one or more output signals of the beamforming network 112. For example, the feedback signal may be the coupled output of the feedback component 114. That is, the feedback signal may correspond to the one or more output signals at a reduced power level. In some implementations, the feedback signal may be a linear combination of the one or more output signals (e.g., in a form that is understandable to the calibration component 126).

The feedback signal may enable the calibration component 126 to compensate for end-to-end errors (e.g., phase errors, beam port isolation errors, and/or the like) of the base station 120 and the testing system 110. For example, the feedback signal may enable the calibration component 126 to compensate for phase errors resulting from a signal transmitted by the transceiver array 122 (e.g., the input signal) traversing the connection between the transceiver array 122 and the test panel 124, the test panel 124, the connection between the test panel 124 and the beamforming network 112, and/or the beamforming network 112. In other words, the feedback signal may enable the calibration component 126 to compensate for a phase error associated with the output signal of the beamforming network 112, such as a phase shift between the input signal transmitted by the one or more transceivers of the transceiver array 122 and the output signal transmitted by the beamforming network 112.

In some implementations, the calibration component 126 may be configured with one or more signal modification parameters (e.g., offset values, coefficient values, and/or the like) that are to be applied to the feedback signal received from the feedback component 114. The calibration component 126 may apply the one or more signal modification parameters to the feedback signal in a testing scenario (and may not apply the one or more signal modification parameters in an operating scenario). The signal modification parameters may modify the feedback signal to compensate for phase adjustment calibrations used by the base station 120 in an operating scenario.

In addition, the calibration component 126 may determine an adjustment for the transceiver array 122 based on the feedback signal. For example, the calibration component 126 may determine, based on the feedback signal, that the transceiver array 122 is to adjust a phase of a signal transmitted by the transceiver array 122. Accordingly, during a testing scenario, the calibration component 126 may cause the transceiver array 122 to transmit a phase-adjusted signal that is based on the feedback signal. In this way, the testing system 110 (e.g., test component 116) may perform and/or enable testing, analysis, troubleshooting, and/or the like, of the base station 120 with improved accuracy.

In some implementations, the calibration component 126 may be configured to transmit calibration signals that are received at the feedback component 114 and provided to the transceiver array 122 of the base station 120 in a manner that is reversed to the description herein. For example, the calibration component 126 may provide a calibration signal to the feedback component 114, and the feedback component 114 may be configured to output one or more feedback signals that are based on the calibration signal, as described above. The feedback component 114 may output the one or more feedback signals to the test component 116 to enable the test component 116 to perform testing, analysis, troubleshooting, and/or the like, of the one or more feedback signals, as described above. In addition, the feedback component 114 may output the one or more feedback signals to the beamforming network 112. In such a case, the beamforming network 112 may be configured to provide one or more output signals, associated with a beam direction, that are based on the one or more feedback signals, as described above. The beamforming network 112 may provide the one or more output signals to one or more transceivers of the transceiver array 122 (e.g., via the test panel 124). Such output signals, which simulate a beamformed transmission of a UE, may enable the calibration component 126 to determine an adjustment for the transceiver array 122, as described above. For example, the calibration component 126 may determine, based on an output signal, that the transceiver array 122 is to adjust a phase of a signal received by the transceiver array 122.

As shown in FIG. 1B, multiple testing systems 110a-110c may be connected to the base station 120 for testing of multiple antenna polarizations (e.g., as shown by test panels 124a-124c) of the base station 120. For example, multiple beamforming network 112 and feedback component 114 combinations may be connected to the base station 120, and the multiple combinations may be associated with a single test component 116 or respective test components 116. As shown in FIG. 1B, if the base station 120 does not include respective calibration components 126 for the multiple antenna polarizations of the base station 120, output signals from multiple beamforming networks 112 may be combined into a single feedback signal (e.g., using a single feedback component 114 or respective secondary feedback components 114 that provide feedback signals to a primary feedback component 114 that performs feedback signal combination) that is provided to the calibration component 126 of the base station 120.

As indicated above, FIGS. 1A and 1B are provided merely as one or more examples. Other examples may differ from what is described with regard to FIGS. 1A and 1B.

Figure 2:
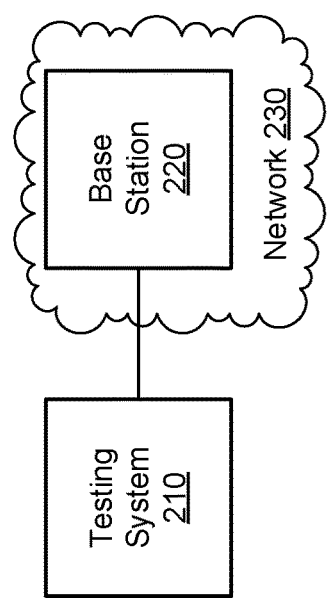
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a testing system 210, a base station 220, and a network 230. Devices of environment 200 may interconnect via wired connections, wireless connections, or a combination of wired and wireless connections.

Testing system 210 includes one or more devices capable of communicating with base station 220 and/or a network (e.g., network 230), such as to perform processing of a signal produced by base station 220. Testing system 210 may communicate with base station 220 by a wired connection, as described elsewhere herein. In some implementations, testing system 210 may wirelessly communicate with base station 220.

Testing system 210 may include a beamforming network, a feedback component, and/or a test component as described elsewhere herein. The beamforming network may include an analog beamforming network that outputs a signal associated with a beam direction, as described elsewhere herein. The feedback component may include a passive RF component, such as an RF coupler, that outputs a feedback signal based on an output signal of the beamforming network or a calibration signal of a calibration component of the base station 220, as described elsewhere herein. The test component may include one or more devices capable of receiving, generating, storing, processing, and/or providing information associated with a signal, such as an RF signal (e.g., an output signal of the beamforming network). For example, the test component may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Base station 220 includes one or more devices capable of communicating with a UE using a cellular radio access technology (RAT). For example, base station 220 may include a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 220 may transfer traffic between a UE (e.g., using a cellular RAT), other base stations 220 (e.g., using a wireless interface or a backhaul interface, such as a wired backhaul interface), and/or network 230. Base station 220 may provide one or more cells that cover geographic areas. Some base stations 220 may be mobile base stations. Some base stations 220 may be capable of communicating using multiple RATs.

In some implementations, base station 220 may perform scheduling and/or resource management for UEs covered by base station 220 (e.g., UEs covered by a cell provided by base station 220). In some implementations, base stations 220 may be controlled or coordinated by a network controller, which may perform load balancing, network-level configuration, and/or the like. The network controller may communicate with base stations 220 via a wireless or wireline backhaul. In some implementations, base station 220 may include a network controller, a self-organizing network (SON) module or component, or a similar module or component. In other words, a base station 220 may perform network control, scheduling, and/or network management functions (e.g., for other base stations 220 and/or for uplink, downlink, and/or sidelink communications of UEs covered by the base station 220). In some implementations, base station 220 may include a central unit and multiple distributed units. The central unit may coordinate access control and communication with regard to the multiple distributed units. The multiple distributed units may provide UEs and/or other base stations 220 with access to network 230.

In some implementations, base station 220 may be capable of MIMO communication (e.g., beamformed communication). In some implementations, base station 220 may include a calibration component for phase calibration of signals produced or received by base station 220, as described elsewhere herein. In a testing scenario, one or more antenna elements (e.g., an antenna array) of base station 220 may be disconnected, and base station 220 may be connected to a test panel, as described elsewhere herein.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The quantity and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
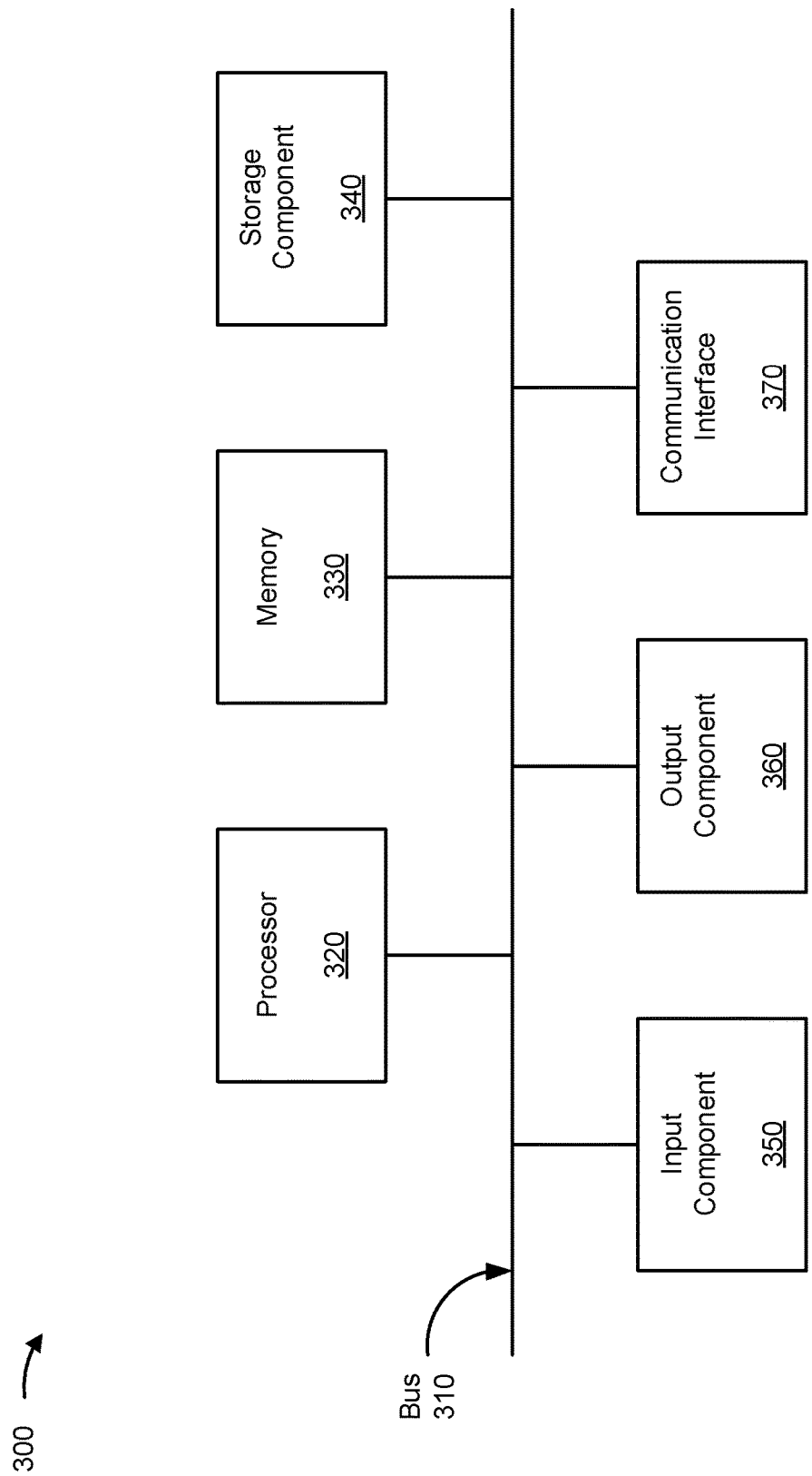
FIG. 3 is a diagram of example components of one or more devices of FIG. 2.

FIG. 3 is a diagram of example components of a device 300. Device 300 may correspond to testing system 210 (e.g., the beamforming network, the feedback component, and/or the test component) and/or base station 220 (e.g., the calibration component). In some implementations, testing system 210 (e.g., the beamforming network, the feedback component, and/or the test component) and/or base station 220 (e.g., the calibration component) may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component (e.g., an interconnecting signal fabric) that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The quantity and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for testing of a base station with beamforming capability. In some implementations, one or more process blocks of FIG. 4 may be performed by a testing system (e.g., testing system 210). In some implementations, one or more process blocks of FIG. 4 may be performed by another device or a group of devices separate from or including the testing system, such as base station 220, and/or the like.

As shown in FIG. 4, process 400 may include receiving one or more input signals originating from one or more transceivers of a base station (block 410). For example, the testing system (e.g., using processor 320, memory 330, input component 350, communication interface 370, and/or the like) may receive one or more input signals originating from one or more transceivers of a base station, as described above.

As further shown in FIG. 4, process 400 may include forming, based on the one or more input signals, one or more output signals associated with a beam direction (block 420). For example, the base station testing system (e.g., using processor 320, memory 330, output component 360, communication interface 370, and/or the like) may form, based on the one or more input signals, one or more output signals associated with a beam direction, as described above.

As further shown in FIG. 4, process 400 may include providing a feedback signal, that is based on the one or more output signals, to a calibration component of the base station (block 430). For example, the base station testing system (e.g., using processor 320, memory 330, output component 360, communication interface 370, and/or the like) may provide a feedback signal, that is based on the one or more output signals, to a calibration component of the base station, as described above.

Process 400 may include additional implementations, such as any single implementation or any combination of implementations described below and/or in connection with one or more other processes described elsewhere herein.

In a first implementation, the base station testing system may include a beamforming network configured to receive the one or more input signals and form the one or more output signals, and a feedback component configured to transmit the feedback signal. In a second implementation, alone or in combination with the first implementation, the feedback component is included in the beamforming network. In a third implementation, alone or in combination with one or more of the first and second implementations, the feedback component is connected to an output of the beamforming network.

In a fourth implementation, alone or in combination with one or more of the first through third implementations, process 400 further includes forming the feedback signal at a proportional power level of the one or more output signals. In a fifth implementation, alone or in combination with one or more of the first through fourth implementations, the feedback signal is to be used by the calibration component to compensate for a phase error associated with the one or more output signals.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station testing apparatus, comprising:
   a beamforming network, comprising:
     at least one input port configured to receive one or more input signals originating from one or more transceivers of a base station; and
     at least one output port configured to receive a signal from the at least one input port that is based on the one or more input signals, and to output, based on the signal, one or more output signals associated with a beam direction;
   a feedback component configured to provide a feedback signal, that is based on the one or more output signals, to a calibration component of the base station, and
     the calibration component configured to use the feedback signal to cause the one or more transceivers to transmit a phase-adjusted signal; and
   a test component configured to receive the phase-adjusted signal.

2. The base station testing apparatus of claim 1, wherein the signal excites the at least one output port, thereby causing the one or more output signals.

3. The base station testing apparatus of claim 1, wherein the at least one output port is a broadside beam port.

4. The base station testing apparatus of claim 1, wherein the feedback signal corresponds to at least one of the one or more output signals.

5. The base station testing apparatus of claim 1, wherein the feedback component is included in the beamforming network.

6. The base station testing apparatus of claim 1, wherein the feedback component is a radio frequency coupler.

7. The base station testing apparatus of claim 1, wherein the at least one output port is configured to provide the one or more output signals to the test component.

8. The base station testing apparatus of claim 1, wherein the feedback signal is to be used by the calibration component to compensate for a phase shift between the one or more input signals and the one or more output signals.

9. A base station testing system, comprising:
   a feedback component configured to output one or more feedback signals that are based on one or more calibration signals received from a calibration component of a base station;
   a beamforming network configured to provide one or more output signals, that are based on the one or more feedback signals and are associated with a beam direction, to the base station, wherein the beamforming network comprises:
     at least one input port configured to receive the one or more feedback signals from the feedback component, and
     at least one output port configured to receive a signal from the at least one input port that is based on the one or more feedback signals, and to output, based on the signal, the one or more output signals; and
   a test component configured to receive the one or more feedback signals of the feedback component.

10. The base station testing system of claim 9, wherein the feedback component is included in the beamforming network.

11. The base station testing system of claim 9, wherein the feedback component is located between the beamforming network and the test component.

12. The base station testing system of claim 9, wherein the feedback component is a radio frequency coupler.

13. The base station testing system of claim 9, wherein the one or more output signals are to be used by the calibration component to compensate for a phase error associated with the beamforming network.

14. A method, comprising:
   receiving, by a base station testing system, one or more input signals originating from one or more transceivers of a base station;
   forming, by the base station testing system and based on the one or more input signals, one or more output signals associated with a beam direction; and
   providing, by the base station testing system, a feedback signal, that is based on the one or more output signals to a calibration component of the base station,
     the calibration component configured to use the feedback signal to cause the one or more transceivers to transmit a phase-adjusted signal; and
   receiving, by a test component of the base station testing system, the phase-adjusted signal.

15. The method of claim 14, wherein the base station testing system comprises:
   a beamforming network configured to receive the one or more input signals and form the one or more output signals; and a feedback component configured to transmit the feedback signal.

16. The method of claim 15, wherein the feedback component is included in the beamforming network.

17. The method of claim 15, wherein the feedback component is connected to an output of the beamforming network.

18. The method of claim 15, wherein the feedback component is a radio frequency coupler.

19. The method of claim 14, further comprising forming the feedback signal at a proportional power level of the one or more output signals.

20. The method of claim 14, wherein the feedback signal is to be used by the calibration component to compensate for a phase error associated with the one or more output signals.

* * * * *